(12) United States Patent
Inagaki et al.

(10) Patent No.: US 12,066,797 B2
(45) Date of Patent: *Aug. 20, 2024

(54) FAULT PREDICTION METHOD AND FAULT PREDICTION SYSTEM FOR PREDECTING A FAULT OF A MACHINE

(71) Applicants: FANUC CORPORATION, Yamanashi (JP); Preferred Networks, Inc., Tokyo (JP)

(72) Inventors: Shougo Inagaki, Yamanashi (JP); Hiroshi Nakagawa, Yamanashi (JP); Daisuke Okanohara, Tokyo (JP); Ryosuke Okuta, Tokyo (JP); Eiichi Matsumoto, Tokyo (JP); Keigo Kawaai, Tokyo (JP)

(73) Assignees: FANUC CORPORATION, Yamanashi (JP); PREFERRED NETWORKS, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/585,477

(22) Filed: Jan. 26, 2022

(65) Prior Publication Data
US 2022/0146993 A1 May 12, 2022

Related U.S. Application Data

(63) Continuation of application No. 16/407,451, filed on May 9, 2019, now Pat. No. 11,275,345, which is a (Continued)

(30) Foreign Application Priority Data

Jul. 31, 2015 (JP) .................................. 2015-152572
Nov. 30, 2015 (JP) .................................. 2015-234022

(51) Int. Cl.
*G05B 13/02* (2006.01)
*B25J 9/16* (2006.01)
(Continued)

(52) U.S. Cl.
CPC .......... *G05B 13/0265* (2013.01); *B25J 9/163* (2013.01); *G05B 15/02* (2013.01); (Continued)

(58) Field of Classification Search
CPC ........... G05B 2219/33321; G05B 2219/37214; G05B 2219/50185; G05B 2219/34477; (Continued)

(56) References Cited

U.S. PATENT DOCUMENTS

| | | | |
|---|---|---|---|
| 6,216,048 B1 | 4/2001 | Keeler et al. | |
| 6,442,511 B1 * | 8/2002 | Sarangapani | G06F 11/008 702/194 |

(Continued)

FOREIGN PATENT DOCUMENTS

| | | |
|---|---|---|
| CN | 101008992 A | 8/2007 |
| CN | 101126929 A | 2/2008 |

(Continued)

OTHER PUBLICATIONS

Chen et al., "Rotating machinery fault diagnosis based on Elman neural network optimized by immune genetic algorithm", Journal of Chongqing University, vol. 35, No. 6, p. 7-13, (May 15, 2012), 7pp.

(Continued)

*Primary Examiner* — Vincent H Tran
(74) *Attorney, Agent, or Firm* — HAUPTMAN HAM, LLP

(57) ABSTRACT

An anomality prediction system, which predicts an anomality of a machine, includes: one or more memories; and one or more processors configured to: obtain a state variable including at least one of output data from at least one sensor (Continued)

that detects a state of at least one of the machine or a surrounding environment, internal data of control software controlling the machine, or computational data obtained based on at least one of the output data or the internal data; generate, by inputting the obtained state variable into a machine learning model, a degree of anomaly of the machine based on output from the machine learning model; and notify information based on the generated degree of anomaly, wherein the notified information includes at least one of the generated degree of anomaly at one or more time points, or one or more levels of anomaly based on the generated degree of anomaly.

44 Claims, 6 Drawing Sheets

Related U.S. Application Data continuation of application No. 15/220,925, filed on Jul. 27, 2016, now Pat. No. 10,317,853.

(51) Int. Cl.
    G05B 15/02    (2006.01)
    G05B 19/4063    (2006.01)
    G05B 23/02    (2006.01)
    G06N 3/04    (2023.01)
    G06N 3/08    (2023.01)
    G06N 5/048    (2023.01)
    G06N 20/00    (2019.01)
    G06N 3/044    (2023.01)
    G06N 3/084    (2023.01)

(52) U.S. Cl.
    CPC ....... *G05B 19/4063* (2013.01); *G05B 23/024* (2013.01); *G06N 3/04* (2013.01); *G06N 3/08* (2013.01); *G06N 5/048* (2013.01); *G06N 20/00* (2019.01); *G05B 2219/31359* (2013.01); *G05B 2219/33321* (2013.01); *G06N 3/044* (2023.01); *G06N 3/084* (2013.01); *Y02P 90/02* (2015.11); *Y10S 901/47* (2013.01)

(58) Field of Classification Search
    CPC .. G06N 20/00; G06N 3/08; B25J 9/163; B25J 9/1674
    See application file for complete search history.

(56) References Cited

U.S. PATENT DOCUMENTS

| | | | |
|---|---|---|---|
| 6,502,085 B1 | 12/2002 | Adibhatla et al. | |
| 7,069,185 B1 | 6/2006 | Wilson et al. | |
| 8,112,381 B2* | 2/2012 | Yuan | G06N 7/01 340/529 |
| 8,612,029 B2 | 12/2013 | Cottrell et al. | |
| 9,626,258 B2* | 4/2017 | Halker | H02J 50/60 |
| 9,792,656 B1 | 10/2017 | Konrardy et al. | |
| 10,317,853 B2* | 6/2019 | Inagaki | G06N 3/08 |
| 11,275,345 B2* | 3/2022 | Inagaki | G05B 15/02 |
| 2001/0039481 A1 | 11/2001 | Tremblay et al. | |
| 2002/0091972 A1* | 7/2002 | Harris | G07F 19/20 714/E11.02 |
| 2003/0149547 A1 | 8/2003 | Nakao et al. | |
| 2004/0002928 A1 | 1/2004 | Huang | |
| 2004/0068388 A1* | 4/2004 | Smith | G06F 21/81 702/150 |
| 2004/0162887 A1 | 8/2004 | Dillon et al. | |
| 2004/0176926 A1 | 9/2004 | Edie et al. | |
| 2005/0286077 A1* | 12/2005 | Ishibashi | G06K 15/1809 358/1.14 |
| 2005/0288898 A1 | 12/2005 | Le | |
| 2006/0036403 A1 | 2/2006 | Wegerich et al. | |
| 2006/0071666 A1 | 4/2006 | Unsworth et al. | |
| 2006/0111857 A1 | 5/2006 | Shah et al. | |
| 2006/0195201 A1* | 8/2006 | Nauck | G05B 17/02 700/44 |
| 2006/0243180 A1 | 11/2006 | Sundermeyer et al. | |
| 2007/0038838 A1 | 2/2007 | Greis et al. | |
| 2007/0156373 A1* | 7/2007 | Yamashita | F24F 11/38 702/182 |
| 2007/0156620 A1 | 7/2007 | Hartman et al. | |
| 2007/0220368 A1 | 9/2007 | Jaw et al. | |
| 2008/0255772 A1 | 10/2008 | Sjostrand et al. | |
| 2009/0119243 A1* | 5/2009 | Yuan | G06N 7/01 706/52 |
| 2010/0030521 A1 | 2/2010 | Akhrarov et al. | |
| 2010/0057649 A1 | 3/2010 | Lee et al. | |
| 2010/0106458 A1* | 4/2010 | Leu | F04B 49/065 702/181 |
| 2010/0185414 A1* | 7/2010 | Yamamoto | G05B 23/0224 702/183 |
| 2010/0257410 A1 | 10/2010 | Cottrell et al. | |
| 2011/0066391 A1* | 3/2011 | AbuAli | G06Q 10/06 702/182 |
| 2012/0185728 A1 | 7/2012 | Guo et al. | |
| 2012/0277949 A1 | 11/2012 | Ghimire et al. | |
| 2012/0304008 A1 | 11/2012 | Hackstein et al. | |
| 2013/0204808 A1 | 8/2013 | Jiang et al. | |
| 2013/0268241 A1* | 10/2013 | Das | G05B 23/024 702/185 |
| 2013/0274898 A1* | 10/2013 | Thatikonda | G05B 23/0224 700/44 |
| 2013/0294938 A1 | 11/2013 | Worden et al. | |
| 2014/0136178 A1* | 5/2014 | Meagher | G06N 20/00 703/18 |
| 2014/0201571 A1 | 7/2014 | Hosek et al. | |
| 2014/0215621 A1 | 7/2014 | Xaypanya et al. | |
| 2014/0258187 A1* | 9/2014 | Suleiman | G06F 11/3447 706/12 |
| 2014/0285212 A1 | 9/2014 | Amoussouga et al. | |
| 2014/0298099 A1 | 10/2014 | Tan et al. | |
| 2014/0324739 A1 | 10/2014 | Claussen et al. | |
| 2014/0351642 A1* | 11/2014 | Bates | G06F 11/2257 714/26 |
| 2014/0365195 A1 | 12/2014 | Lahiri et al. | |
| 2015/0066431 A1 | 3/2015 | Zheng et al. | |
| 2015/0067410 A1* | 3/2015 | Kumar | G06F 11/004 714/47.3 |
| 2015/0073751 A1 | 3/2015 | Liao et al. | |
| 2015/0074023 A1* | 3/2015 | Gu | G06N 3/08 706/20 |
| 2015/0120639 A1* | 4/2015 | Shin | G06N 20/00 706/46 |
| 2015/0125970 A1 | 5/2015 | Chen et al. | |
| 2015/0135012 A1* | 5/2015 | Bhalla | G06N 20/00 714/26 |
| 2015/0154062 A1 | 6/2015 | Watanabe et al. | |
| 2015/0160098 A1* | 6/2015 | Noda | G01M 99/00 702/35 |
| 2015/0219530 A1 | 8/2015 | Li et al. | |
| 2015/0254336 A1* | 9/2015 | Besuchet | G05B 19/404 707/737 |
| 2015/0314447 A1 | 11/2015 | Zhang et al. | |
| 2016/0091393 A1* | 3/2016 | Liao | G01M 13/00 702/34 |
| 2016/0091397 A1* | 3/2016 | Shinkle | G05B 23/0232 702/35 |
| 2016/0203036 A1 | 7/2016 | Mezic et al. | |
| 2016/0313216 A1* | 10/2016 | Pal | B23Q 17/0971 |
| 2016/0314632 A1 | 10/2016 | Lu et al. | |
| 2016/0327606 A1* | 11/2016 | Van Wieringen | G06N 3/08 |
| 2016/0342903 A1 | 11/2016 | Shumpert | |
| 2017/0009690 A1* | 1/2017 | Sato | F02D 29/02 |
| 2017/0031792 A1* | 2/2017 | Yuan | G06F 11/2257 |

(56) References Cited

U.S. PATENT DOCUMENTS

| | | | |
|---|---|---|---|
| 2017/0045589 A1* | 2/2017 | Hernandez Manchola | ............... H02H 3/006 |
| 2018/0059656 A1* | 3/2018 | Hiruta | ............... G01R 31/343 |

FOREIGN PATENT DOCUMENTS

| | | | |
|---|---|---|---|
| CN | 101127100 A | 2/2008 |
| CN | 101697079 A | 4/2010 |
| CN | 102063109 A | 5/2011 |
| CN | 102609764 A | 7/2012 |
| CN | 102629243 A | 8/2012 |
| CN | 102844721 A | 12/2012 |
| CN | 103018660 A | 4/2013 |
| CN | 103064340 A | 4/2013 |
| CN | 104571079 A | 4/2015 |
| CN | 104699994 A | 6/2015 |
| EP | 1882922 B1 | 3/2012 |
| JP | S63123105 A | 5/1988 |
| JP | H1-237344 A | 9/1989 |
| JP | H8202444 A | 8/1996 |
| JP | H8263131 A | 10/1996 |
| JP | H1039908 A | 2/1998 |
| JP | H1049223 A | 2/1998 |
| JP | H10154900 A | 6/1998 |
| JP | H10267509 A | 10/1998 |
| JP | H11212637 A | 8/1999 |
| JP | 200064964 A | 3/2000 |
| JP | 200376414 A | 3/2003 |
| JP | 2003208220 A | 7/2003 |
| JP | 2005-207644 A | 8/2005 |
| JP | 2006-300896 A | 11/2006 |
| JP | 2008-537262 A | 9/2008 |
| JP | 2010-160589 A | 7/2010 |
| JP | 2011-180673 A | 9/2011 |
| JP | 2012168799 A | 9/2012 |
| JP | 2013-8111 A | 1/2013 |
| JP | 201496050 A | 5/2014 |
| JP | 2014-132400 A | 7/2014 |
| JP | 5684941 B1 | 3/2015 |
| JP | 2015-88079 A | 5/2015 |
| JP | 2015-88154 A | 5/2015 |
| JP | 5715288 B1 | 5/2015 |
| JP | 201588078 A | 5/2015 |
| JP | 5875734 B2 | 3/2016 |
| WO | 2008120552 A1 | 10/2008 |

OTHER PUBLICATIONS

Chang et al., "An Online Fault Tolerant Actor-critic Neuro-control for a Class of Nonlinear Systems using Neural Network HJB Approach", International Journal of Control, Automation and Systems, vol. 13 No. 2, pp. 311-318 (Apr. 30, 2015), 8pp.

* cited by examiner

FAULT PREDICTION METHOD AND FAULT PREDICTION SYSTEM FOR PREDECTING A FAULT OF A MACHINE

RELATED APPLICATIONS

The present application is a continuation of U.S. patent application Ser. No. 16/407,451, filed May 9, 2019, which is a continuation of U.S. patent application Ser. No. 15/220,925, filed Jul. 27, 2016, which claims priority to Japanese Patent Application Number 2015-152572, filed Jul. 31, 2015, and Japanese Patent Application Number 2015-234022, filed Nov. 30, 2015, the disclosures of which are hereby incorporated by reference herein in their entireties.

BACKGROUND OF THE INVENTION

1. Field of the Invention

The present invention relates to a machine learning method and a machine learning device for learning fault conditions, and a fault prediction device and a fault prediction system including the machine learning device.

2. Description of the Related Art

In an industrial machine, to improve the yield and prevent accidents, abnormality of any component may be detected in advance. For example, one known method compares the output value of a sensor with a predetermined threshold to detect an abnormality on the basis of the comparison result. An "industrial machine" herein refers to not only industrial robots and machines controlled by CNC (Computer Numerical Control) devices but also machines including service robots and various mechanical devices.

Japanese Laid-open Patent Publication No. S63(1988)-123105 discloses a fault prediction diagnosis method for comparing the operation pattern of a robot in operation with a reference operation pattern for the robot in the normal state to predict a fault of the robot.

Japanese Laid-open Patent Publication No. H10(1998)-039908 discloses a fault prediction method for comparing the difference between the load-side power based on the actual operation state of a drive shaft and the driving-side power based on an operation command issued to the drive shaft with a determination value to evaluate whether a robot mechanism portion has deteriorated and the level of deterioration.

Unfortunately, with greater complexity and sophistication of industrial machines, factors which lead to faults are becoming more complicated. Therefore, conventional fault prediction methods performed in accordance with a predetermined procedures are often inapplicable to actual circumstances or deficient in accuracy. This has triggered a demand for a fault prediction device capable of accurate fault prediction according to the circumstances involved.

SUMMARY OF INVENTION

According to a first aspect of the present invention, there is provided a machine learning device that learns a condition associated with a fault of an industrial machine, the device including a state observation unit that, while the industrial machine is in operation or at rest, observes a state variable comprising at least one of data output from a sensor that detects a state of one of the industrial machine and a surrounding environment, internal data of control software controlling the industrial machine, and computational data obtained based on one of the output data and the internal data; a determination data obtaining unit that obtains determination data used to determine one of whether a fault has occurred in the industrial machine and a degree of fault; and a learning unit that learns the condition associated with the fault of the industrial machine in accordance with a training data set generated based on a combination of the state variable and the determination data.

According to a second aspect of the present invention, in the first aspect, the learning unit may be configured to learn the condition in accordance with the training data set generated for each of a plurality of industrial machines.

According to a third aspect of the present invention, in the first and second aspects, the learning unit may learn a normal state only in a predetermined period and then detects occurrence of a fault determined by the determination data obtaining unit.

According to a fourth aspect of the present invention, in any one of the first to third aspects, when the determination data obtaining unit obtains determination data indicating a fault of the industrial machine, the learning unit may update the condition by weighting the determination data comprised in the training data set, in accordance with a length of time from when the determination data is obtained until a fault occurs.

According to a fifth aspect of the present invention, there is provided a fault prediction device that includes the machine learning device according to any one of the first to fourth aspects and predicts a fault of the industrial machine, the fault prediction device further including a fault information output unit that outputs fault information indicating one of whether a fault has occurred in the industrial machine and a degree of fault, in response to input of a current state variable of the state variable, based on a result of learning by the learning unit in accordance with the training data set.

According to a sixth aspect of the present invention, in the fifth aspect, the learning unit may learn the condition again in accordance with an additional training data set generated based on a combination of the current state variable and the determination data.

According to a seventh aspect of the present invention, in the fifth or sixth aspect, the machine learning device may be connected to the industrial machine via a network, and the state observation unit may obtain the current state variable via the network.

According to an eighth aspect of the present invention, in the seventh aspect, the machine learning device may be located on a cloud server.

According to a ninth aspect of the present invention, in any one of the fifth to eighth aspects, the machine learning device may be mounted in a controller that controls the industrial machine.

According to a tenth aspect of the present invention, in any one of the fifth to ninth aspects, the industrial machine may include a plurality of industrial machines, and the learning result obtained by the machine learning device may be shared by the plurality of industrial machines.

According to an eleventh aspect of the present invention, there is provided a fault prediction system including the fault prediction device according to any one of the fifth to tenth aspects; a sensor that outputs the output data; and a fault information notifying unit that notifies an operator of the fault information.

According to a twelfth aspect of the present invention, in the eleventh aspect, a time at that the fault information notifying unit notifies the operator of the fault information may satisfy at least one of precedence to a time defined by a first predetermined period preceding a time at that a fault occurs, and subsequence to a time defined by a second predetermined period preceding the time at that a fault occurs.

According to a thirteenth aspect of the present invention, there is provided a machine learning method for learning a condition associated with a fault of an industrial machine, the method including while the industrial machine is in operation or at rest, observing a state variable comprising at least one of data output from a sensor that detects a state of one of the industrial machine and a surrounding environment, internal data of control software controlling the industrial machine, and computational data obtained based on one of the output data and the internal data; obtaining determination data used to determine one of whether a fault has occurred in the industrial machine and a degree of fault; and learning the condition associated with the fault of the industrial machine in accordance with a training data set generated based on a combination of the state variable and the determination data.

BRIEF DESCRIPTION OF THE DRAWINGS

The present invention will be more clearly understood by reference to the accompanying drawings, in which.

DETAILED DESCRIPTION

Figure 1:
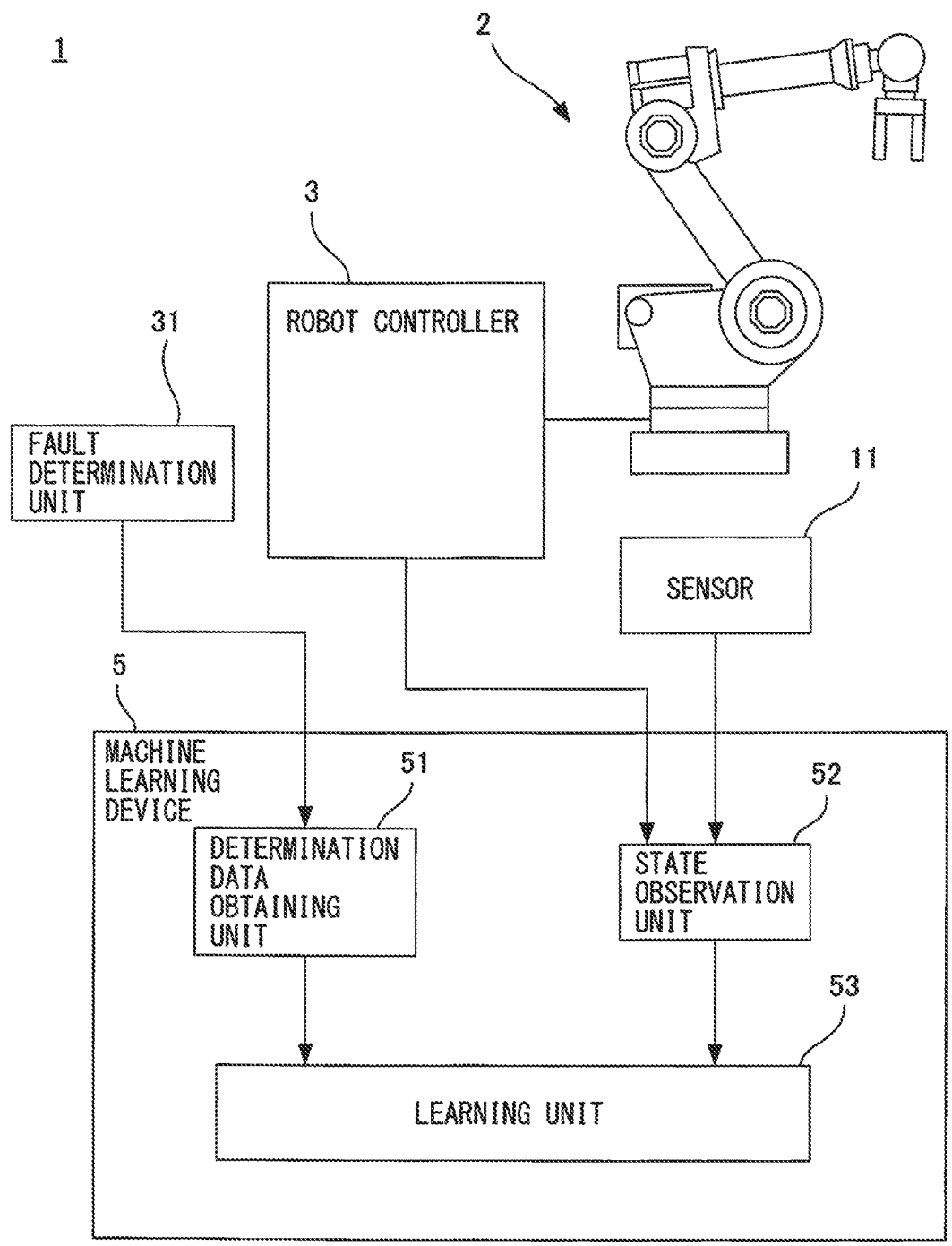
FIG. 1 is a block diagram illustrating an exemplary fault prediction system according to an embodiment.

Embodiments of a machine learning method and a machine learning device, and a fault prediction device and fault prediction system including the machine learning device according to the present invention will be described below with reference to the accompanying drawings. However, it is to be understood that the present invention is not limited to the drawings or the following embodiment. To foster better understanding of the present invention, components according to the embodiment are represented in the drawings in different scales as appropriate. The same reference numerals denote the same or corresponding components.

FIG. 1 is a block diagram illustrating an exemplary fault prediction system according to an embodiment. A fault prediction system 1 can learn conditions associated with a fault of an industrial machine (to be also referred to as "fault conditions" hereinafter) using a machine learning device 5 having the machine learning function. The fault prediction system 1 can generate fault information according to the state of the industrial machine or the environment surrounding it, based on the learning result obtained by the machine learning device 5.

In this specification, an "industrial machine" refers to various machines including industrial robots, service robots, and machines controlled by CNC (Computer Numerical Control) devices. Further, in this specification, a "fault of an industrial machine" includes faults of components constituting an industrial machine. In other words, a "fault of an industrial machine" is not limited to the state in which an intended function of an industrial machine may not be executable, but it includes, e.g., the state in which normal operation may be temporarily or permanently unreproducible.

"Fault information" generated by the fault prediction system 1 includes information indicating whether a fault has occurred in the industrial machine or information indicating the "degree of fault." The "fault information" may include information indicating that the industrial machine is in a normal state. The "degree of fault" refers to the fault seriousness. The "degree of fault" may have its maximum or minimum value limited. The "degree of fault" may be a continuous or discrete quantity. The operator can decide whether the target component is to be replaced or repaired immediately or in the next maintenance operation, in accordance with the "degree of fault."

The fault prediction system 1 used to predict a fault of a robot 2 will be described hereinafter. However, persons skilled in the art would recognize that the present invention may be similarly applicable to any other industrial machines.

The robot 2 illustrated as FIG. 1 is implemented in a six-axis vertical articulated robot with its respective joints driven by motors. The robot 2 is connected to a robot controller 3 via a known communication means. The robot controller 3 generates a command for the robot 2 in accordance with a control program.

The robot controller 3 is implemented in a digital computer including an interface connected to a CPU, a ROM, a RAM, a non-volatile memory, and an external device. The robot controller 3 includes a fault determination unit 31, as illustrated as FIG. 1.

The fault determination unit 31 determines a fault of the robot 2, using the known fault diagnosis method. The fault determination unit 31 determines whether a fault has occurred in the robot 2 or the degree of fault, independently of fault information generated by the fault prediction system 1. When, for example, a disturbance torque detected by a torque sensor or the amplitude of vibration of data output from a sensor exceeds a predetermined threshold, the fault determination unit 31 determines that a fault has occurred. Alternatively, the fault determination unit 31 may determine that a fault has occurred in the robot 2, based on internal data of control software stored in the robot controller 3. In this manner, the fault determination unit 31 determines faults based on various factors. The determination result obtained by the fault determination unit 31 is input to a determination data obtaining unit 51 of the machine learning device 5 (to be described later).

In another embodiment, the machine learning device 5 may be configured to discover a fault of the robot 2 or use the determination data obtaining unit 51 to receive fault information in response to the input operation by an identifiable operator.

The fault prediction system 1 further includes a sensor 11 which detects the state of the robot 2 or the surrounding environment. The sensor 11 may include at least one of a force sensor, a torque sensor, a vibration sensor, a sound collection sensor, an image sensor, a distance sensor, a temperature sensor, a humidity sensor, a flow sensor, a light quantity sensor, a pH sensor, a pressure sensor, a viscosity sensor, and an odor sensor. Data output from the sensor 11 (to be also simply referred to as "output data" hereinafter) is input to a state observation unit 52 of the machine learning device 5.

The machine learning device 5 learns the fault conditions of the robot 2. In an embodiment, the machine learning device 5 may be implemented in a digital computer which is connected to the robot 2 via a network and is independent of the robot controller 3.

In another embodiment, the machine learning device 5 may be built into the robot controller 3. In this case, the machine learning device 5 performs machine learning using the processor of the robot controller 3. In still another embodiment, the machine learning device 5 may be located on a cloud server.

The machine learning device 5 includes a determination data obtaining unit 51, a state observation unit 52, and a learning unit 53, as depicted as FIG. 1.

The determination data obtaining unit 51 obtains determination data from the fault determination unit 31. Determination data is input from the determination data obtaining unit 51 to the learning unit 53 and used by the machine learning device 5 to learn fault conditions. The determination data is defined as data used to determine whether a fault has occurred or the degree of fault. The determination data may include no data representing that a fault has occurred, i.e., that the robot 2 is in an abnormal state.

The state observation unit 52 observes a state variable as an input value for machine learning, while the robot 2 is in operation or at rest. In an embodiment in which the machine learning device 5 is connected to the robot 2 and the sensor 11 via a network, the state observation unit 52 obtains a state variable via the network.

The state variable may include data output from the sensor 11. The state variable may include internal data of control software controlling the robot 2. The internal data may include at least one of the torque, the position, the velocity, the acceleration, the jerk, the current, the voltage, and the estimated disturbance value. The estimated disturbance value is, for example, a disturbance value estimated by an observer based on a torque command and velocity feedback.

The state variable may include computational data obtained based on the output data or the internal data. The computational data may be obtained using at least one of frequency analysis, time-frequency analysis, and autocorrelation analysis. The computational data may be obtained using simpler computation such as coefficient multiplication or differential and integral operation, as a matter of course.

The learning unit 53 learns fault conditions in accordance with a training data set generated based on a combination of the state variable output from the state observation unit 52 and the determination data output from the determination data obtaining unit 51. The training data set is data associating the state variable and the determination data with each other.

Figure 2:
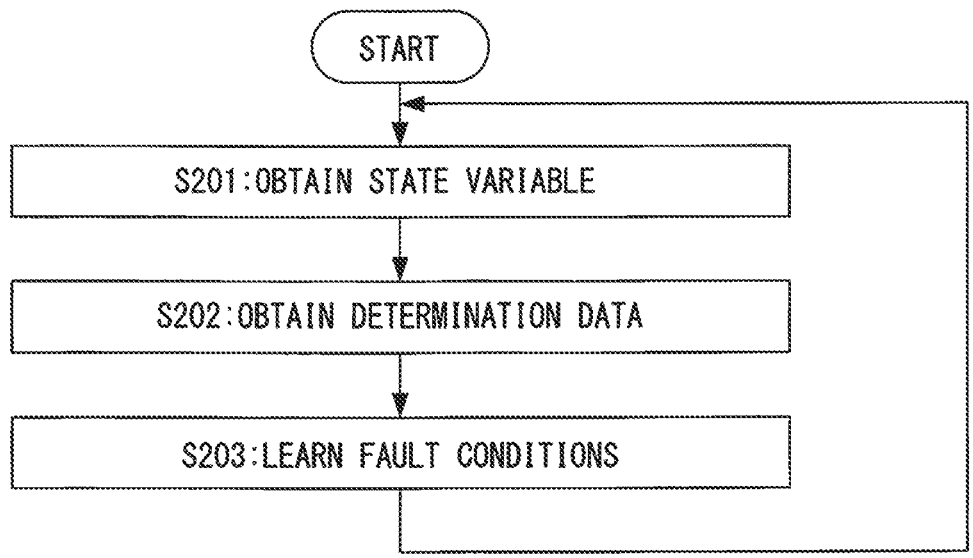
FIG. 2 is a flowchart illustrating an exemplary sequence of the learning process in a machine learning device.

An exemplary learning process in the machine learning device 5 will be described below with reference to FIG. 2. When learning is started, the state observation unit 52 obtains a state variable including, e.g., output data, internal data, or computational data in step S201. In step S202, the determination data obtaining unit 51 obtains determination data on the basis of the determination result obtained by the fault determination unit 31.

In step S203, the learning unit 53 learns fault conditions in accordance with a training data set generated based on a combination of the state variable obtained in step S201 and the determination data obtained in step S202. The processes in steps S201 to S203 are repeated until the machine learning device 5 satisfactorily learns fault conditions.

Figure 3:
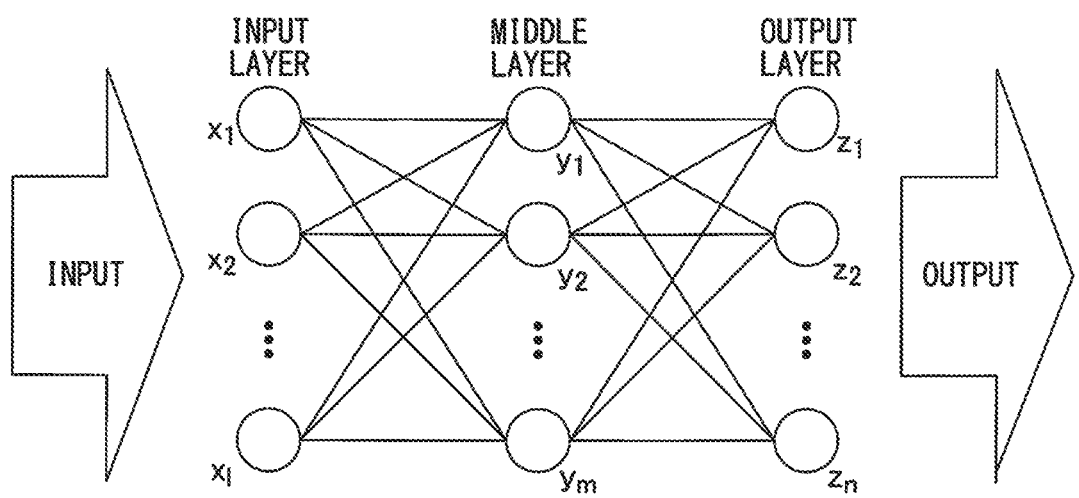
FIG. 3 is a diagram illustrating an exemplary configuration of a neural network.

In an embodiment, the learning unit 53 of the machine learning device 5 may learn fault conditions in accordance with a neural network model. FIG. 3 illustrates an exemplary neural network model. The neural network includes an input layer including 1 neurons $x_1, x_2, x_3, \ldots, x_l$, a middle layer (hidden layer) including m neurons $y_1, y_2, y_3, \ldots, y_m$, and an output layer including n neurons $z_1, z_2, z_3, \ldots, z_n$. Although FIG. 3 depicts only one middle layer, two or more middle layers may be formed. Although the machine learning device 5 (neural network) may use a general-purpose computer or processor, the use of, e.g., GPGPU (General-Purpose computing on Graphics Processing Units) or large-scale PC clusters allows higher-speed processing.

The neural network learns fault conditions associated with a fault of the robot 2. The neural network learns the relationship between the state variable observed by the state observation unit 52 and the occurrence of a fault, i.e., fault conditions, by so-called supervised learning, in accordance with a training data set generated based on a combination of this state variable and the determination data obtained by the determination data obtaining unit 51. In supervised learning, a large number of sets of data of certain inputs and results (labels) are fed into a machine learning device, which learns features observed in these data sets and inductively acquires a model for estimating the result from the input, i.e., their relationship.

Alternatively, the neural network may accumulate only state variables while no fault has occurred, i.e., while the robot 2 is in normal operation, to learn fault conditions by so-called unsupervised learning. When, for example, the rate of occurrence of a fault of the robot 2 is very low, unsupervised learning may be effective. In unsupervised learning, only input data are fed into a learning device in large amounts, which learns the distribution of the input data and learns a device which, e.g., compresses, classifies, and shapes the input data, without corresponding teacher output data being fed into the learning device. This allows, e.g., clustering of features seen in these data sets into similar features. The obtained result can be used to define certain criteria and allocate outputs in an optimizing manner according to the criteria, thus predicting an output. Intermediate problem setting between unsupervised learning and supervised learning, called semi-supervised learning, is also available. This applies when, for example, only some data serve as data sets of inputs and outputs and the remaining data include only inputs.

Figure 4:
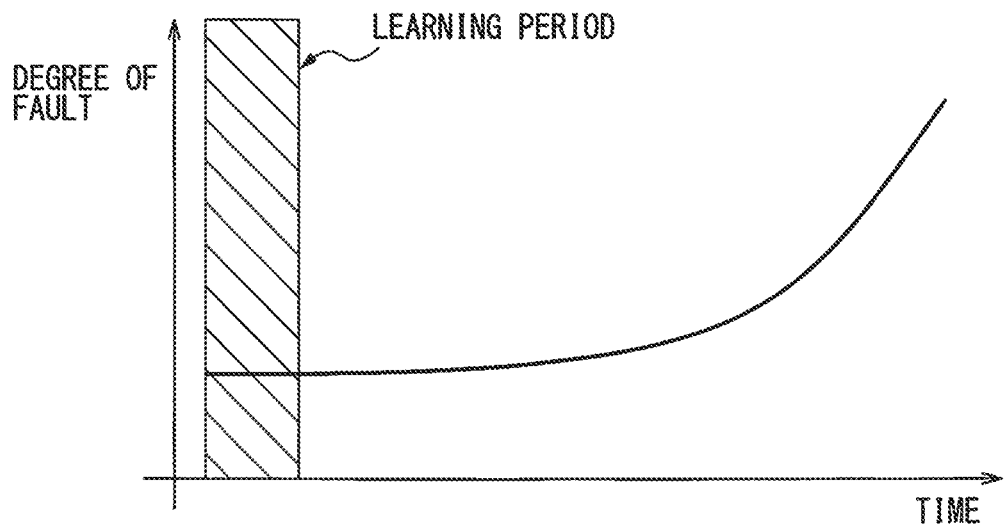
FIG. 4 is a graph for explaining an exemplary learning period in the unsupervised learning method.

FIG. 4 is a graph for explaining an exemplary learning period in an unsupervised learning method. The abscissa represents time (elapse of time) and the ordinate represents the degree of fault. In an unsupervised learning method as described above, a certain predetermined period, for example, several weeks, starting from immediately after shipment or maintenance of the robot 2 is established as a learning period. Only during this period, the state variable is updated and the resultant state is defined as being normal, as illustrated as FIG. 4. After that, the state variable is no longer updated and solely abnormality determination is performed, by outputting a "degree of fault" on the basis of the distance between the result output from the neural network and the normal model, thus achieving abnormality detection.

In this embodiment, since, for example, time-series data having a certain temporal correlation is modeled, the use of a neural network called the recurrent type is also effective. An RNN (Recurrent Neural Network) forms a learning model not exclusively using the state at the current time instant but using the internal states at the previous time instants, together. The recurrent neural network can be handled similarly to the general neural network, assuming the network expanded along the time axis. Although a variety of recurrent neural networks are available, a simple recurrent network (Elman Network) will be taken as an example below.

Figure 5A:
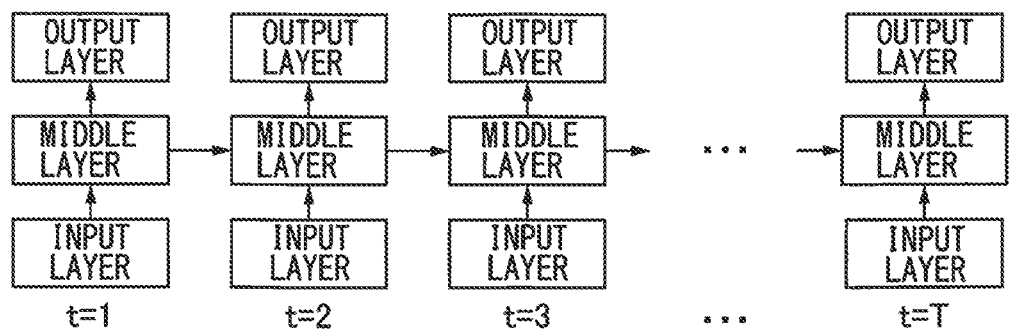
FIGS. 5A and 5B illustrate views for explaining an exemplary recurrent neural network.
Figure 5B:
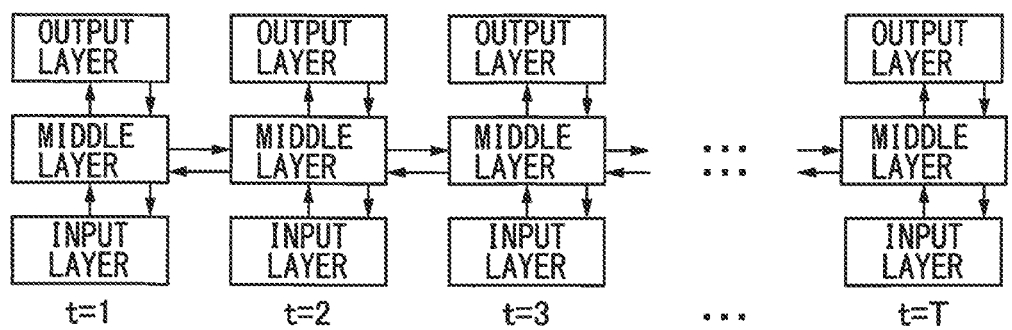

FIGS. 5A and 5B illustrate views for explaining an exemplary recurrent neural network. FIG. 5A represents the time expansion of an Elman network, and in FIG. 5B, the BPTT (Back Propagation Through Time) in the error backpropagation method. Backpropagation is applicable as long as an Elman network architecture, as depicted in FIG. 5A, is used.

However, in the Elman network, unlike the normal neural network, the error propagates backwards in time, as depicted in FIG. 5B. Such backpropagation is called the BPTT (Back Propagation Through Time). The use of such a neural network architecture allows estimation of a model for the output, based on the past input transition to use, for example, information indicating whether the estimated output value is equal to a predefined outlier, for the relationship with the occurrence of a fault.

In fault prediction (to be described later), the output layer outputs information indicating whether a fault has occurred or the "degree of fault" corresponding to the above-mentioned fault information in response to the state variable input to the input layer of the neural network. The "degree of fault" may have its maximum or minimum value limited or be a continuous or discrete quantity.

The machine learning device and the machine learning method according to the above-described embodiment can learn fault conditions according to the actual circumstances of use which are more accurate than fault conditions based on the determination data output from the determination data obtaining unit 51. This allows accurate fault prediction even when factors which may lead to faults are complicated and make it difficult to preset fault conditions.

In an embodiment, when the determination data obtaining unit 51 obtains determination data representing a fault of the robot 2, the learning unit 53 may update the fault conditions by weighting each determination data in accordance with the length of time from when this determination data is obtained until a fault occurs. The shorter the time from when determination data is obtained until a fault actually occurs, the closer the estimated state is to a state directly related to the occurrence of a fault. Therefore, fault conditions can be effectively learned by weighting the determination data in accordance with the time elapsed after a training data set is obtained.

In an embodiment, the learning unit 53 may learn fault conditions in accordance with training data sets generated for a plurality of robots 2. The learning unit 53 may obtain training data sets from a plurality of robots 2 used in the same location or learn fault conditions using training data sets collected from a plurality of robots 2 independently operating in different locations. A robot 2 may be added, in the course of data collection, to a group of robots from which a training data set is collected or, conversely, may be excluded from a group of robots from which a training data set is collected.

As methods for sharing training data sets for a plurality of robots 2, three examples will be given below, but other methods may be applicable, as a matter of course. First, a method for sharing the same model for a neural network is available, in which, for example, the difference between respective robots 2 is sent and reflected using a communication means, for each weighting factor of a network. Second, the weight of the machine learning device 5 and the like may be shared by sharing a data set of the input and output of a neural network. Third, a given database is provided and accessed to load a more appropriate model for a neural network to share the state (use similar models).

Figure 6:
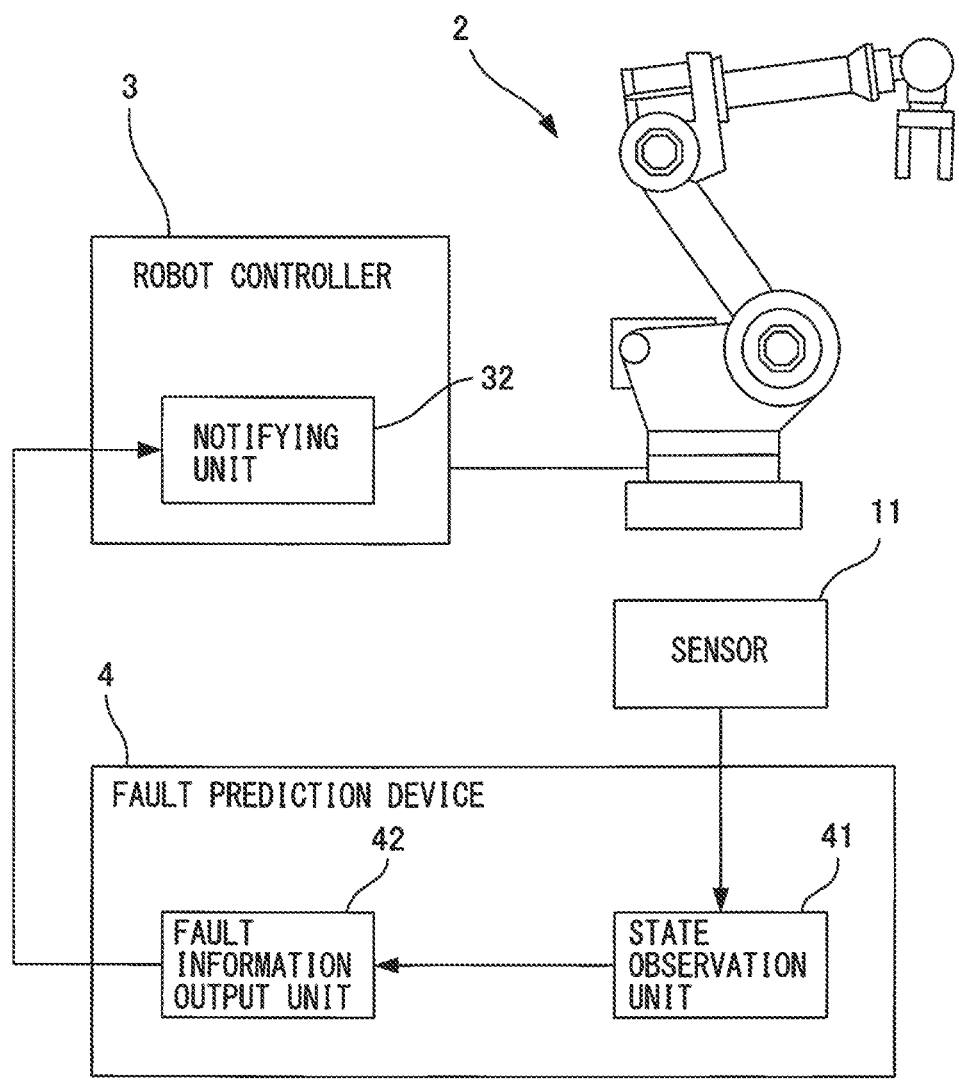
FIG. 6 is a block diagram illustrating an exemplary fault prediction system according to another embodiment.

FIG. 6 is a block diagram illustrating an exemplary fault prediction system according to another embodiment. A fault prediction system 1 includes a fault prediction device 4 which generates fault information for a robot 2, using the learning result obtained by a machine learning device 5.

The fault prediction device 4 includes a state observation unit 41 and a fault information output unit 42. The state observation unit 41 functions similarly to the state observation unit 52 described with reference to FIG. 1 and obtains a state variable reflecting the state of the robot 2 or the surrounding environment. The fault information output unit 42 outputs the fault information of the robot 2 in response to input of the state variable via the state observation unit 41, based on the result of learning by a learning unit 53 of the above-mentioned machine learning device 5 in accordance with a training data set.

A robot controller 3 can include a notifying unit (fault information notifying unit) 32, as depicted as FIG. 6. The notifying unit 32 notifies the operator of the fault information output from the fault information output unit 42. The mode in which the operator is notified of the fault information is not particularly limited as long as the fault information is identifiable to the operator. For example, information indicating whether a predicted fault has occurred or the degree of fault may be displayed on a display (not illustrated) or an alarm sound may be produced in accordance with the details of the fault information.

Figure 7A:
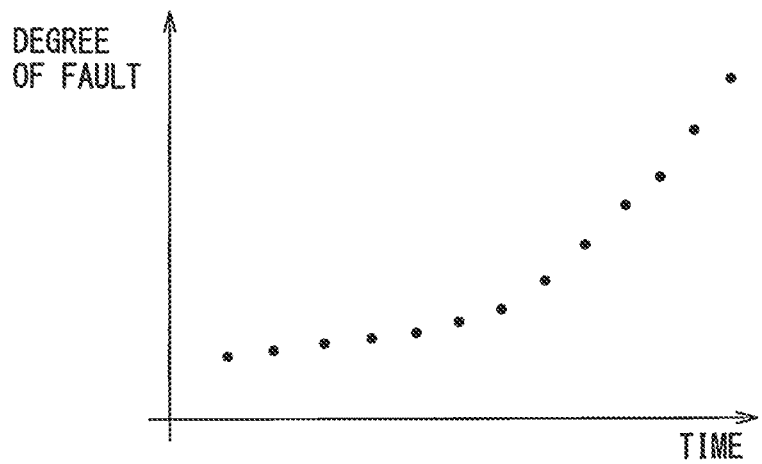
FIGS. 7A-7C illustrate graphs (type 1) for explaining exemplary index values representing the degrees of fault in the fault prediction system according to the embodiment.
Figure 7B:
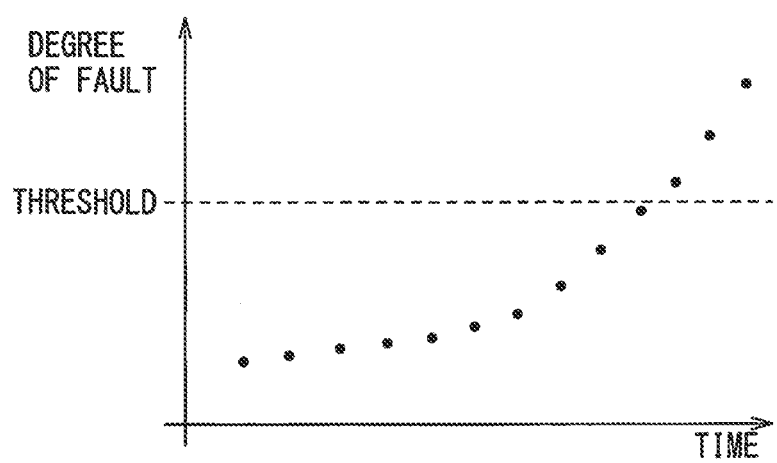
Figure 7C:
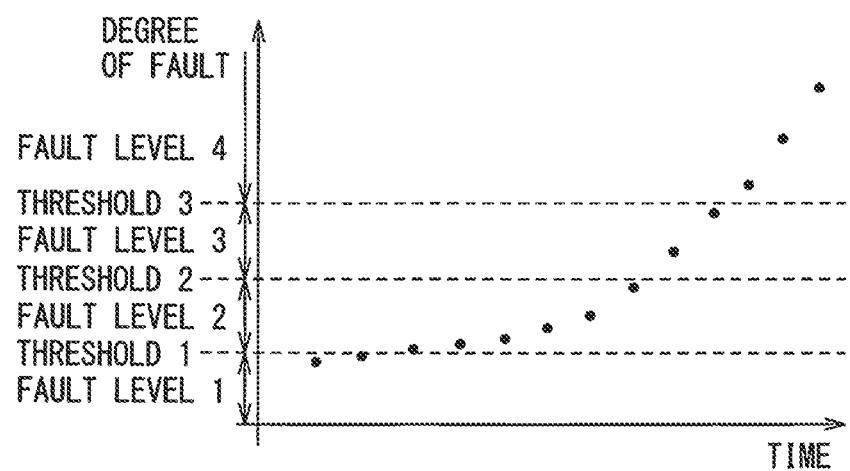

FIGS. 7A-7C and FIG. 8 are graphs for explaining exemplary index values representing the degrees of fault (first to fourth examples) in the fault prediction system according to the embodiment. Referring to FIGS. 7A-7C and FIG. 8, the abscissa represents time and the ordinate represents the degree of fault. In, e.g., the first example, an index value representing the "degree of fault" may be set higher for a state closer to a fault, and the fault information output unit 42 can output the index value obtained by learning, directly as fault information, as illustrated in FIG. 7A. In, e.g., the second example, a threshold may be set for the above-mentioned index value, and the fault information output unit 42 can output as fault information, information indicating whether a fault has occurred by defining a value equal to or larger than the threshold as being abnormal, and a value smaller than the threshold as being normal, as illustrated in FIG. 7B. In, e.g., the third example, a plurality of thresholds (thresholds 1 to 3) may be set for the above-mentioned index value, and the fault information output unit 42 can output as fault information, threshold-specific levels (fault levels 1 to 4), as illustrated in FIG. 7C.

Figure 8:
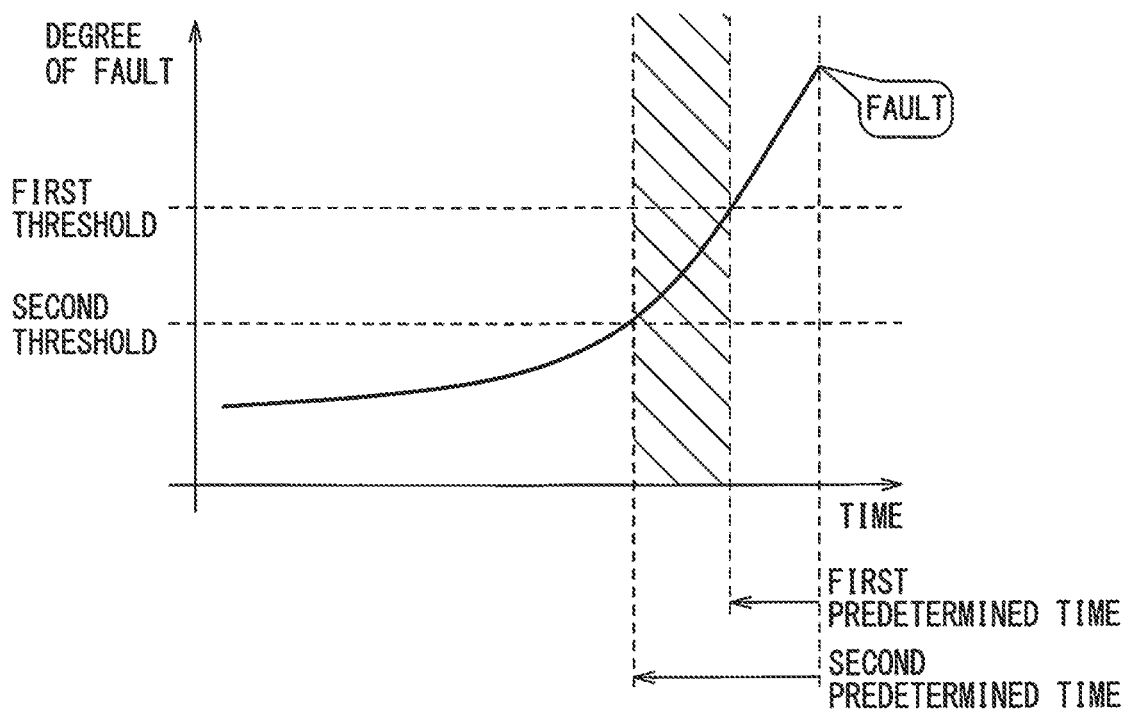
FIG. 8 is a graph (type 2) for explaining an exemplary index value representing the degree of fault in the fault prediction system according to the embodiment.

In, e.g., the fourth example, a relation between the above-mentioned index value and the time until a fault occurs is obtained based on a plurality of data (teacher data) which lead to faults, and a first threshold for satisfying precedence to a time defined by a first predetermined period preceding the time at which a fault occurs is, in turn, obtained based on the obtained relationship, as illustrated as FIG. 8. A second threshold for satisfying subsequence to a time defined by a second predetermined period preceding the time at which a fault occurs is further determined. When at least one of the conditions that the index value is smaller than the first threshold and that the index value is equal to or larger than the second threshold is satisfied, the fault information output unit 42 may output as fault information the index value itself or a level of the index value, wherein the levels are created by separating the scale of the index value according to the thresholds. A threshold can be determined in this case to, for example, allow the past teacher data to satisfy all conditions, set a margin as appropriate, or even stochastically tolerate determination errors within a predetermined range of probability.

Figure 9:
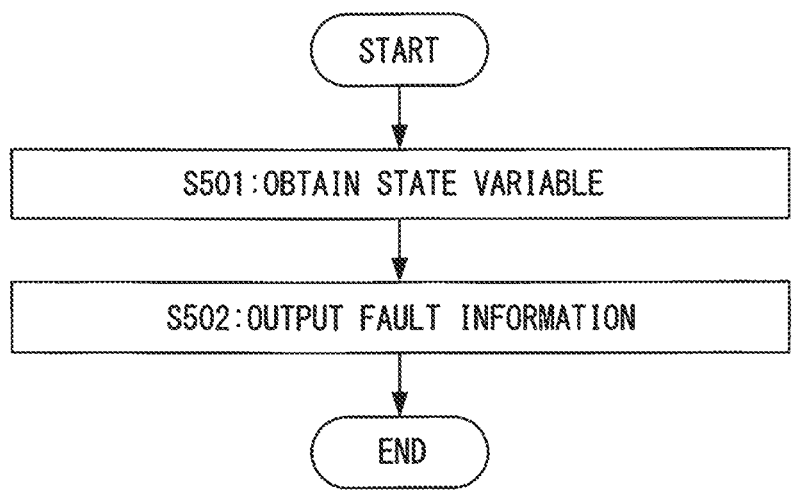
FIG. 9 is a flowchart illustrating an exemplary sequence of fault prediction which exploits a learning result.

Exemplary fault prediction performed using the learning result obtained by the machine learning device will be described below with reference to FIG. 9. In step S501, the state observation unit 41 obtains the current state variable including data output from, e.g., a sensor 11. In step S502, the fault information output unit 42 outputs fault information according to the state variable obtained in step S501, based on the above-mentioned learning result obtained by the machine learning device 5. When the fault prediction system 1 includes a notifying unit 32, the step of notifying the operator of fault information may be executed after step S502.

The fault prediction by the fault prediction device 4 described with reference to FIG. 9 may be performed when the robot 2 executes a specific operation determined in advance. Alternatively, the processes in steps S501 and S502 may be continuously executed in parallel while the robot 2 is in operation or at rest. Fault prediction may be periodically performed at predetermined time instants.

In an embodiment, the machine learning device 5 may execute machine learning in parallel with fault prediction by the fault prediction device 4. In this case, while the fault prediction device 4 generates fault information, the learning unit 53 of the machine learning device 5 learns fault conditions again, based on the determination data obtained by a fault determination unit 31 or via the operator operation, and the state variable at this point in time.

Although an embodiment in which machine learning is performed using a neural network has been described above, machine learning may be performed in accordance with other known methods such as genetic programming, functional logic programming, or support vector machine. Again, in this specification, an "industrial machine" refers to various machines including industrial robots, service robots, and machines controlled by CNC (Computer Numerical Control) devices, as described earlier.

The machine learning device and the machine learning method according to the present invention learn conditions associated with a fault of an industrial machine, in accordance with a training data set generated based on a combination of the state variable and the determination data. Since fault conditions are learned while actually operating the industrial machine, accurate fault conditions according to the actual circumstances of use are learned. In addition, since the fault prediction device and the fault prediction system according to the present invention include a machine learning device capable of machine learning of fault conditions, they achieve accurate fault prediction according to the actual circumstances of use.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A fault prediction method of predicting a fault of a machine, the method comprising:
   obtaining, by one or more processors, a state variable including at least one of output data from at least one sensor that detects a state of at least one of the machine or a surrounding environment, internal data of control software controlling the machine, or computational data obtained based on at least one of the output data or the internal data;
   generating, by the one or more processors and by inputting the obtained state variable into a machine learning model, a degree of fault of the machine based on output from the machine learning model; and
   notifying, by the one or more processors, before the fault of the machine occurs, information based on the generated degree of fault, wherein
   the notified information includes at least one of the generated degree of fault or a level of fault based on the generated degree of fault, and
   the notifying comprises displaying, on a display device, a graph having a first axis representing a passage of time and a second axis representing a value regarding the degree of fault generated based on the output from the machine learning model, and
   the at least one of the generated degree of fault or the level of fault at time points in the graph,
   wherein the displaying includes displaying, on the display device, information related to a comparison between the generated degree of fault and one or more thresholds for the generated degree of fault.

2. The fault prediction method according to claim 1, wherein one or more levels of fault, including the level of fault, are decided by comparing the generated degree of fault with the one or more thresholds.

3. The fault prediction method according to claim 1, further comprising:
   producing, by the one or more processors, an alarm sound based on the generated degree of fault.

4. The fault prediction method according to claim 1, wherein the degree of fault is generated by inputting time-series data of the obtained state variable into the machine learning model.

5. The fault prediction method according to claim 1, wherein the machine learning model is a neural network.

6. The fault prediction method according to claim 1, wherein the notifying comprises notifying an operator of the machine of the information.

7. The fault prediction method according to claim 1, wherein the machine learning model has been learned by using at least one of a first training data set including a combination of a state variable of a second machine and a label or a second training data set including a state variable of the second machine in normal operation.

8. The fault prediction method according to claim 7, wherein the machine and the second machine are the same machine.

9. The fault prediction method according to claim 7, wherein the machine learning model has been learned by using the second training data set including the state variable obtained during a certain period starting from after shipment or maintenance of the second machine.

10. The fault prediction method according to claim 1, wherein the generated degree of fault is the output from the machine learning model.

11. The fault prediction method according to claim 1, wherein the machine learning model is a normal model, and the degree of fault is generated based on a distance from the normal model.

12. The fault prediction method according to claim 1, wherein the machine learning model is learned using state variables obtained by a plurality of machines.

13. The fault prediction method according to claim 1, further comprising:
learning the machine learning model in parallel with execution of fault prediction.

14. The fault prediction method according to claim 1, wherein the generated degree of fault is information about a component of the machine.

15. The fault prediction method according to claim 1, wherein the notifying comprises:
notifying, by the one or more processors, the information based on the generated degree of the fault, even without classifying a type of the fault of the machine.

16. The fault prediction method according to claim 1, wherein the fault of the machine includes an abnormality of the machine.

17. The fault prediction method according to claim 1, wherein the information related to the comparison includes fault information, decided based on the comparison, indicating whether the fault of the machine has occurred.

18. The fault prediction method according to claim 1, wherein the information related to the comparison includes fault information indicating a plurality of fault levels decided based on the comparison.

19. The fault prediction method according to claim 1, wherein the graph includes the one or more thresholds indicating one or more fault levels.

20. A fault prediction system configured to predict a fault of a machine, the fault prediction system comprising:
one or more memories; and
one or more processors configured to:
obtain a state variable including at least one of output data from at least one sensor that detects a state of at least one of the machine or a surrounding environment, internal data of control software controlling the machine, or computational data obtained based on at least one of the output data or the internal data;
generate, by inputting the obtained state variable into a machine learning model, a degree of fault of the machine based on output from the machine learning model; and
notify, before the fault of the machine occurs, information based on the generated degree of fault, wherein
the notified information includes at least one of the generated degree of fault or a level of fault based on the generated degree of fault, and
the one or more processors are configured to notify the information by displaying, on a display device,
a graph having a first axis representing a passage of time and a second axis representing a value regarding the degree of fault generated based on the output from the machine learning model, and
the at least one of the generated degree of fault or the level of fault at time points in the graph,
wherein the displaying includes displaying, on the display device, information related to a comparison between the generated degree of fault and one or more thresholds for the generated degree of fault.

21. The fault prediction system according to claim 20, wherein the machine learning model has been learned by using at least one of a first training data set including a combination of a state variable of a second machine and a label or a second training data set including a state variable of the second machine in normal operation.

22. The fault prediction system according to claim 21, wherein the machine and the second machine are the same machine.

23. The fault prediction system according to claim 21, wherein the machine learning model has been learned by using the second training data set including the state variable obtained during a certain period starting from after shipment or maintenance of the second machine.

24. The fault prediction system according to claim 20, wherein one or more levels of fault, including the level of fault, are decided by comparing the generated degree of fault with the one or more thresholds.

25. The fault prediction system according to claim 20, wherein
the one or more processors are further configured to cause an alarm sound to be produced based on the generated degree of fault.

26. The fault prediction system according to claim 20, wherein the degree of fault is generated by inputting time-series data of the obtained state variable into the machine learning model.

27. The fault prediction system according to claim 20, wherein the machine learning model is a neural network.

28. The fault prediction system according to claim 20, wherein the one or more processors are configured to notify an operator of the machine of the information.

29. The fault prediction system according to claim 20, wherein the generated degree of fault is the output from the machine learning model.

30. The fault prediction system according to claim 20, wherein the machine learning model is a normal model, and the degree of fault is generated based on a distance from the normal model.

31. The fault prediction system according to claim 20, wherein the machine learning model is learned using state variables obtained by a plurality of machines.

32. The fault prediction system according to claim 20, wherein the one or more processors are further configured to learn the machine learning model in parallel with execution of fault prediction.

33. The fault prediction system according to claim 20, wherein the generated degree of fault is information about a component of the machine.

34. The fault prediction system according to claim 20, wherein the one or more processors are configured to notify the information based on the generated degree of the fault, even without classifying a type of the fault of the machine.

35. The fault prediction system according to claim 20, wherein the fault of the machine includes an abnormality of the machine.

36. The fault prediction system according to claim 20, wherein the information related to the comparison includes fault information, decided based on the comparison, indicating whether the fault of the machine has occurred.

37. The fault prediction system according to claim 20, wherein the information related to the comparison includes fault information indicating a plurality of fault levels decided based on the comparison.

38. The fault prediction system according to claim 20, wherein the graph includes the one or more thresholds indicating one or more fault levels.

39. A non-transitory computer readable medium storing therein a program which, when executed by one or more processors, cause the one or more processors to perform a method comprising:

obtaining, by the one or more processors, a state variable including at least one of output data from at least one sensor that detects a state of at least one of the machine or a surrounding environment, internal data of control software controlling the machine, or computational data obtained based on at least one of the output data or the internal data;

generating, by the one or more processors and by inputting the obtained state variable into a machine learning model a degree of fault of the machine based on output from the machine learning model; and notifying, by the one or more processors, before the fault of the machine occurs, information based on the generated degree of fault, wherein the notified information includes at least one of the generated degree of fault of a level of fault based on the generated degree of fault, and the notifying comprises displaying, on a display device,
a graph having a first axis representing a passage of time and a second axis representing a value regarding the degree of fault generated based on the output from the machine learning model, and
the at least one of the generated degree of fault or the level of fault at time points in the graph, wherein the displaying includes displaying, on the display device, information related to a comparison between the generated degree of fault and one or more thresholds for the generated degree of fault.

40. The non-transitory computer readable medium according to claim 39, wherein the notifying comprises:
notifying, by the one or more processors, the information based on the generated degree of the fault, even without classifying a type of the fault of the machine.

41. The non-transitory computer readable medium according to claim 39, wherein the fault of the machine includes an abnormality of the machine.

42. The non-transitory computer readable medium according to claim 39, wherein the information related to the comparison includes fault information, decided based on the comparison, indicating whether the fault of the machine has occurred.

43. The non-transitory computer readable medium according to claim 39, wherein the information related to the comparison includes fault information indicating a plurality of fault levels decided based on the comparison.

44. The non-transitory computer readable medium according to claim 39, wherein the graph includes the one or more thresholds indicating one or more fault levels.

* * * * *